United States Patent
Korn

(10) Patent No.: US 8,834,031 B2
(45) Date of Patent: Sep. 16, 2014

(54) SHAFT PENETRATION OF A HOUSING OF AN INTERNAL COMBUSTION ENGINE AND BEARING OF A SHAFT PENETRATION

(71) Applicant: Mann+Hummel GmbH, Ludwigsburg (DE)

(72) Inventor: Alexander Korn, Gueglingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 21 days.

(21) Appl. No.: 13/673,218

(22) Filed: Nov. 9, 2012

(65) Prior Publication Data

US 2013/0114920 A1 May 9, 2013

(30) Foreign Application Priority Data

Nov. 9, 2011 (DE) .......................... 10 2011 117 995

(51) Int. Cl.
*F16C 33/02* (2006.01)
*F16C 35/02* (2006.01)
*F16C 17/12* (2006.01)
*F16C 17/02* (2006.01)
*F16C 33/20* (2006.01)

(52) U.S. Cl.
CPC ................ *F16C 17/12* (2013.01); *F16C 35/02* (2013.01); *F16C 17/02* (2013.01); *F16C 33/20* (2013.01)
USPC ........................................................ 384/296

(58) Field of Classification Search
CPC .............. F16C 9/02; F16C 9/04; F16C 17/00; F16C 17/02; F16C 2360/22; F02F 7/0053; Y10S 384/903

USPC ......... 384/215, 275, 276, 294–297, 428, 429, 384/439, 440, 903; 123/193.5
See application file for complete search history.

(56) References Cited

U.S. PATENT DOCUMENTS

| | | | | |
|---|---|---|---|---|
| 4,236,767 | A | * 12/1980 | Feldle | ........................... 384/488 |
| 4,743,173 | A | 5/1988 | Wrobel | |
| 4,883,374 | A | 11/1989 | Rhoads et al. | |
| 6,318,900 | B1 | * 11/2001 | Bere et al. | ...................... 384/535 |

(Continued)

FOREIGN PATENT DOCUMENTS

| | | |
|---|---|---|
| DE | 3417127 A1 | 11/1985 |
| DE | 3514142 A1 | 11/1985 |

(Continued)

OTHER PUBLICATIONS

Translation of JP2605892 (also published as JP3-140622) obtained on Nov. 6, 2013.*

(Continued)

*Primary Examiner* — James Pilkington
(74) *Attorney, Agent, or Firm* — James Hasselbeck

(57) ABSTRACT

A shaft penetration of a housing has a bearing receptacle arranged in the wall of the housing. A bearing is coaxially inserted into the bearing receptacle in an insertion direction. At least one claw is disposed on the bearing and the at least one claw extends at a slant to a central axis of the bearing past a radial outer circumferential side of the bearing and has a free end. The free end of the at least one claw is hooked in a direction opposite to the insertion direction in a radial inner circumferential side of the bearing receptacle.

11 Claims, 4 Drawing Sheets

(56) References Cited

U.S. PATENT DOCUMENTS

| | | |
|---|---|---|
| 6,705,763 B2 | 3/2004 | Kamura et al. |
| 7,230,357 B2 | 6/2007 | Lulic |
| 7,939,980 B2 * | 5/2011 | Miura et al. .................. 310/90 |
| 8,421,319 B2 * | 4/2013 | Miura et al. .................. 384/903 |

FOREIGN PATENT DOCUMENTS

| | | |
|---|---|---|
| DE | 3731710 | 3/1988 |
| DE | 3914175 A1 | 11/1989 |
| DE | 4125203 A1 | 2/1992 |
| DE | 10347361 | 5/2005 |
| DE | 102009030371 A1 | 12/2010 |
| EP | 1270974 A2 | 1/2003 |
| JP | 3140622 A | 6/1991 |
| WO | WO2004048791 A1 | 6/2004 |

OTHER PUBLICATIONS

German (DPMA) Office Action of DE 10 2011 117 995.3.

* cited by examiner

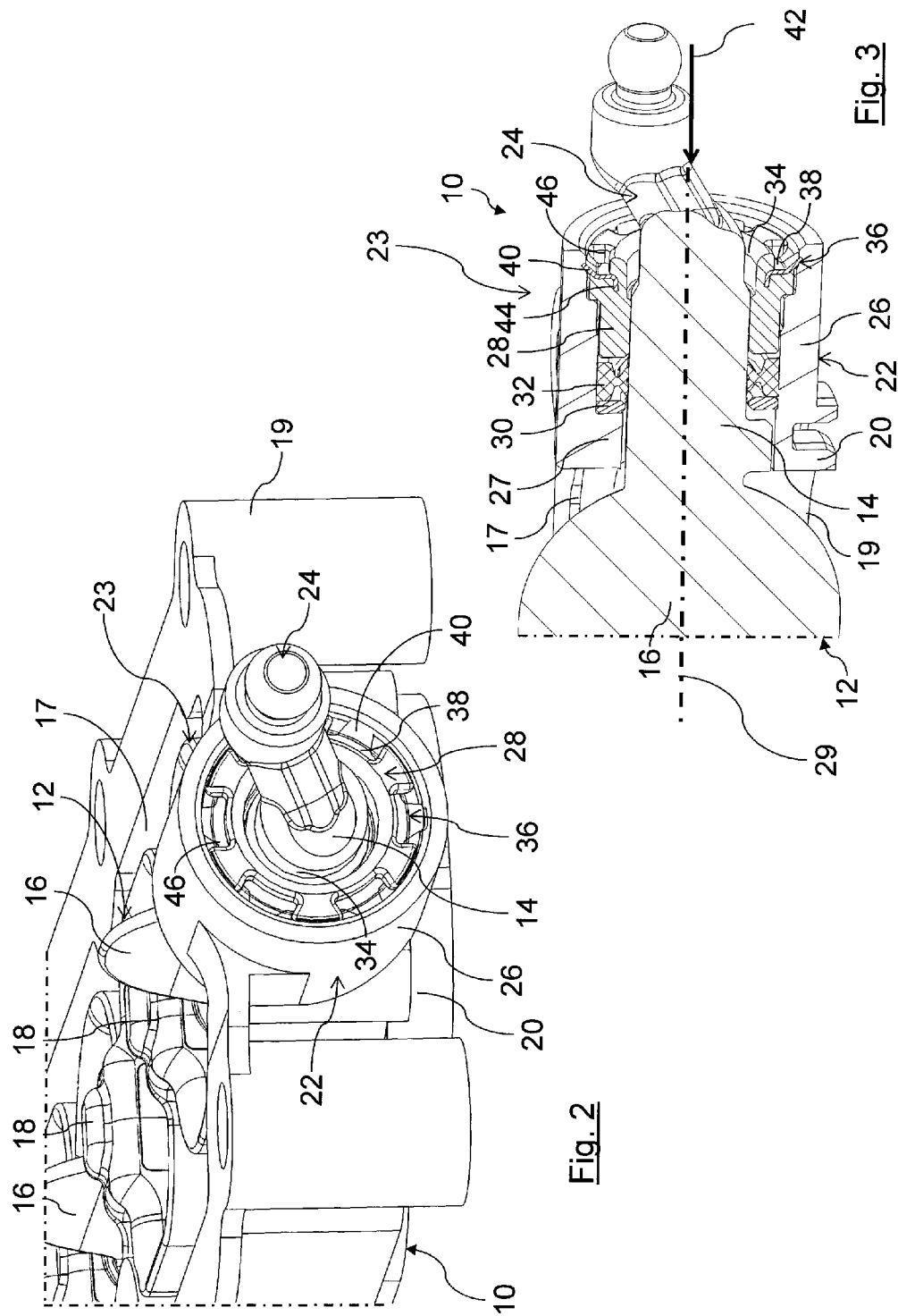

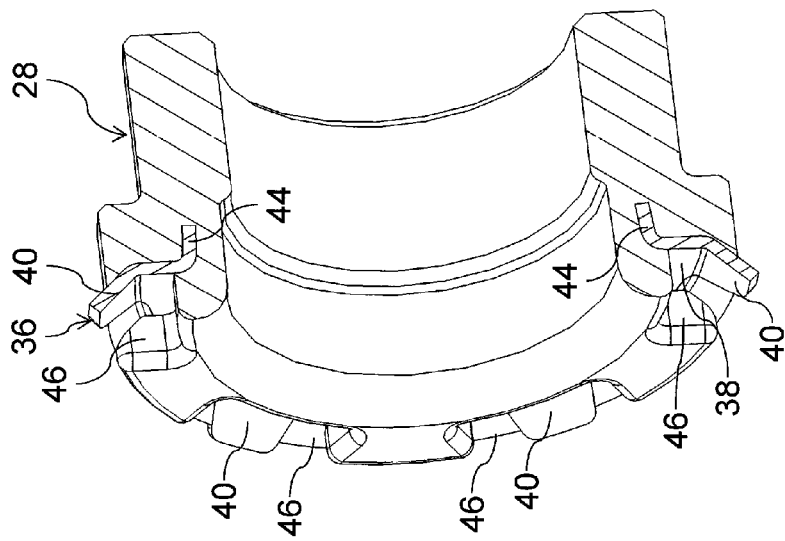
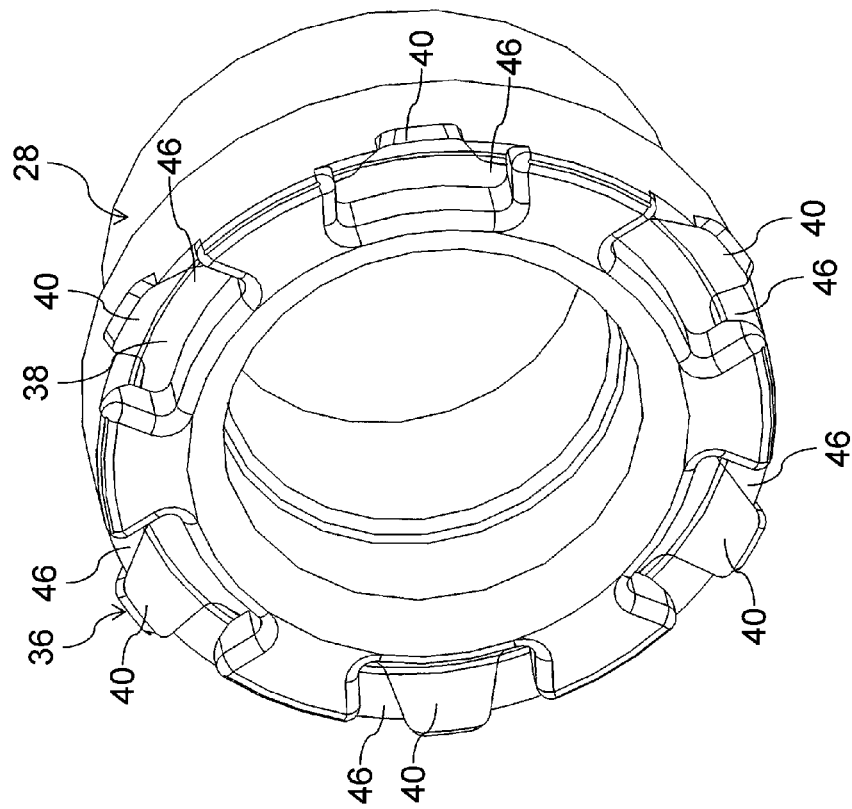

SHAFT PENETRATION OF A HOUSING OF AN INTERNAL COMBUSTION ENGINE AND BEARING OF A SHAFT PENETRATION

CROSS REFERENCE TO RELATED APPLICATIONS

This application claims the benefit under 35 USC 119 of foreign application DE 10 2011 117 995.3 filed in Germany on Nov. 9, 2011 and which is hereby incorporated by reference in its entirety.

TECHNICAL FIELD

The invention concerns a shaft penetration of a housing, in particular of an intake pipe of an internal combustion engine, in particular of a motor vehicle, comprising a bearing receptacle arranged in a wall of the housing and comprising a bearing for the shaft, in particular for a valve shaft of a valve control, wherein the bearing is inserted coaxially into the bearing receptacle.

BACKGROUND OF THE INVENTION

The invention concerns a shaft penetration of a housing, in particular of an intake pipe of an internal combustion engine, in particular of a motor vehicle, comprising a bearing receptacle arranged in a wall of the housing and comprising a bearing for the shaft, in particular for a valve shaft of a valve control, wherein the bearing is inserted coaxially into the bearing receptacle.

Moreover, the invention concerns a bearing of a shaft penetration of a housing, in particular of an intake pipe of an internal combustion engine, in particular of a motor vehicle, for a shaft, in particular a valve shaft of a valve control, wherein the bearing can be inserted coaxially into a bearing receptacle arranged in a wall of the housing.

An intake pipe of an internal combustion engine available on the market comprises a valve shaft on which a plurality of valves are arranged. The valve shaft is rotatably supported in a housing of the intake pipe. By means of the valves, openings in the housing can be opened or closed in order to control a fresh air flow between the fresh air collecting chambers and an end pipe in the interior of the housing. The valve shaft passes with one end through a passage in a wall of the housing. At the end which is outside of the housing the valve shaft is provided with a control lever. By means of the control lever, the valve shaft can be actuated from the exterior of the housing. The passage of the housing has a bearing receptacle in which a bearing is arranged. The valve shaft is rotatably supported in the bearing. The bearing is inserted from the exterior into the bearing receptacle.

SUMMARY OF THE INVENTION

An object of the present invention is to configure a shaft penetration of a housing and a bearing of the aforementioned kind such that the bearing in the bearing receptacle is secured against falling out in a simple manner In particular, the bearing should be self-locking, i.e., have an anti-loss action. Assembly of the shaft penetration should be as simple as possible.

In accordance with the present invention, this is achieved in that on the bearing at least one claw is arranged that extends at a slant to the central axis of the bearing past its radial outer circumferential side and, with its free end, hooks or locks in a direction opposite to the insertion direction of the bearing in a radial inner circumferential side of the bearing receptacle.

According to the invention, the bearing has at least one claw. The claw extends at a slant opposite to the insertion direction of the bearing in radial direction outwardly. The bearing can thus be inserted in a simple way in the insertion direction and in the direction of the least one claw into the bearing receptacle. Upon movement of the bearing, in particular as a result of a force acting on the bearing and/or vibrations, the claw will catch or lock automatically in the radial inner circumferential side of the bearing receptacle in a direction opposite to the insertion direction. In this way, it is prevented that the bearing can move opposite to the insertion direction out of the bearing receptacle. In this way, the bearing cannot fall out or cannot be pushed out in particular during transport of the housing or in operation of the internal combustion engine. The at least one claw can be an anti-loss action for the bearing. When mounting the bearing in the bearing receptacle, the presence of the at least one claw must not be separately checked because it is arranged on the bearing in a captive (anti-loss) way. Advantageously, the bearing can be inserted from the exterior of the housing into the bearing receptacle so that the insertion direction is oriented toward the interior of the housing. Upon operation of the internal combustion engine, the at least one claw prevents that the bearing is pushed out of the bearing receptacle in case of overpressure in the interior of the housing relative to the surroundings, thus causing a force to act on the bearing in a direction opposite to the insertion direction. An additional securing measure of the bearing is not required therefore. Alternatively, it can be provided that the bearing is inserted from the interior of the housing into the bearing receptacle. The insertion direction is thus oriented from the interior to the exterior. In this case, the at least one claw secures the bearing against falling out of the bearing receptacle when underpressure exists in the housing.

Advantageously, the shaft penetration with the bearing that is provided with the at least one claw can be used with a shaft penetration of a valve shaft of a valve control. However, it can also be used in different types of shaft penetrations, in particular for a shaft of an exhaust valve or outlet flap. Should the at least one claw be harder than the radial inner circumferential side of the bearing receptacle, the at least one claw will essentially penetrate, when a force is acting onto the bearing in a direction opposite to the insertion direction, into the radial inner circumferential side of the bearing receptacle. In this way, the self-locking action can be improved with increasing force action onto the bearing. The at least one claw can advantageously be designed to be elastic and springy in radial direction. In this way, the installation of the bearing in the bearing receptacle can be facilitated, in particular the mounting force can be reduced. Instead, the at least one claw can however be rigid in radial direction. The radial inner circumferential side of the bearing receptacle can advantageously be made of elastic material.

In an advantageous embodiment, a plurality of claws can be arranged on an annular support section of a claw ring which is fixedly connected with the bearing. Advantageously, the claws can be arranged at a uniform spacing circumferentially on the support section. In this way, the claw ring can be hooked circumferentially uniformly in the bearing receptacle. In this way, canting of the bearing in the bearing receptacle, in particular in case of a one-sided force action on the bearing, can be avoided. By means of the annular support section the claw ring can be uniformly and stably connected with the bearing. In this way, the force transmission from the claws onto the bearing, on one hand, and of the claws onto the bearing receptacle, on the other hand, can be improved.

Advantageously, the at least one claw, optionally the claw ring, can be integrated into the bearing, in particular, molded or embedded. In this way, a stable and strong connection between the at least one claw, in particular the claw ring, and the bearing is enabled in a simple way. The bearing together with the claw can be premanufactured as a modular component. By means of molding or embedding, in particular by injection molding, the at least one claw, in particular the claw ring can be connected in a simple and stable way with the bearing. With the embedded claw ring the bearing can be mechanically stabilized in addition with regard to its shape.

Moreover, advantageously on the annular support section a plurality of counter hooks can be arranged. The counter hooks extend on a side of the annular support section that, in axial direction relative to the axis of the support section, is opposite to the side where the claws are located. With the counter hooks, the support section can be supported on the bearing. In this way, the support section and thus the claw ring can be stabilized with respect to form and/or position. Force introductions onto the bearing opposite to the insertion direction can thus be transmitted more uniformly onto the bearing. With the counter hooks, the claw ring can be secured additionally on the bearing.

Advantageously, the bearing can be made of plastic material. A bearing of plastic material can be manufactured in a simple way, in particular shaped or molded (cast). When made from plastic material, the bearing can be optimized in a simple way with respect to its sealing action, its bearing action, especially the gliding action of the shaft in the bearing, and/or mounting in optimal way. Plastic material is moreover lightweight and can be recycled easily.

In a further advantageous embodiment, the at least one claw, optionally the annular support section, and/or the counter hooks, can be made of metal. In this way, the at least one claw can be designed to be strong and stable. Rigid as well as elastic claws can be realized when using metal for the claws. In case of a metal claw, the forces that occur upon locking in the bearing receptacle can be transmitted well. Also, metal can be bent easily.

Advantageously, at least the radial inner circumferential side of the bearing receptacle can be made of plastic material. Preferably, the entire bearing receptacle can be made of plastic. In this way, at least the radial inner circumferential side can be designed to be soft so that the at least one claw can hook and lock easily. The radial inner circumferential side can be made of plastic material so as to be elastic which simplifies insertion of the bearing into the bearing receptacle during assembly.

In a further advantageous embodiment, the bearing receptacle can have on its radial inner circumferential side a plurality of circumferential locking recesses for the at least one claw. The at least one claw can engage simply the locking recesses so that securing in the bearing receptacle is improved. The radial inner circumferential side of the bearing receptacle can then be manufactured also of a material that is hard in comparison to the at least one claw, in particular of metal. The at least one claw can then engage and lock on the locking recesses.

The technical object is solved according to the invention moreover by a bearing that has at least one claw that extends at a slant to the center axis of the bearing past a radial outer circumferential side of the bearing. The features and advantages that have been discussed above in connection with the inventive shaft penetration apply likewise to the bearing according to the invention and its advantageous embodiments.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2 shows a detail view of the center part of the intake pipe of FIG. 1 in the area of the shaft penetration;

FIG. 3 is a section view of the center part of the intake pipe of FIGS. 1 and 2 in the area of the shaft penetration;

FIG. 4 shows an isometric illustration of the bearing with the claw ring of the shaft penetration of FIGS. 1 to 3;

FIG. 5 is a longitudinal section of the bearing with the claw ring of FIGS. 1 to 4.

Figure 1:
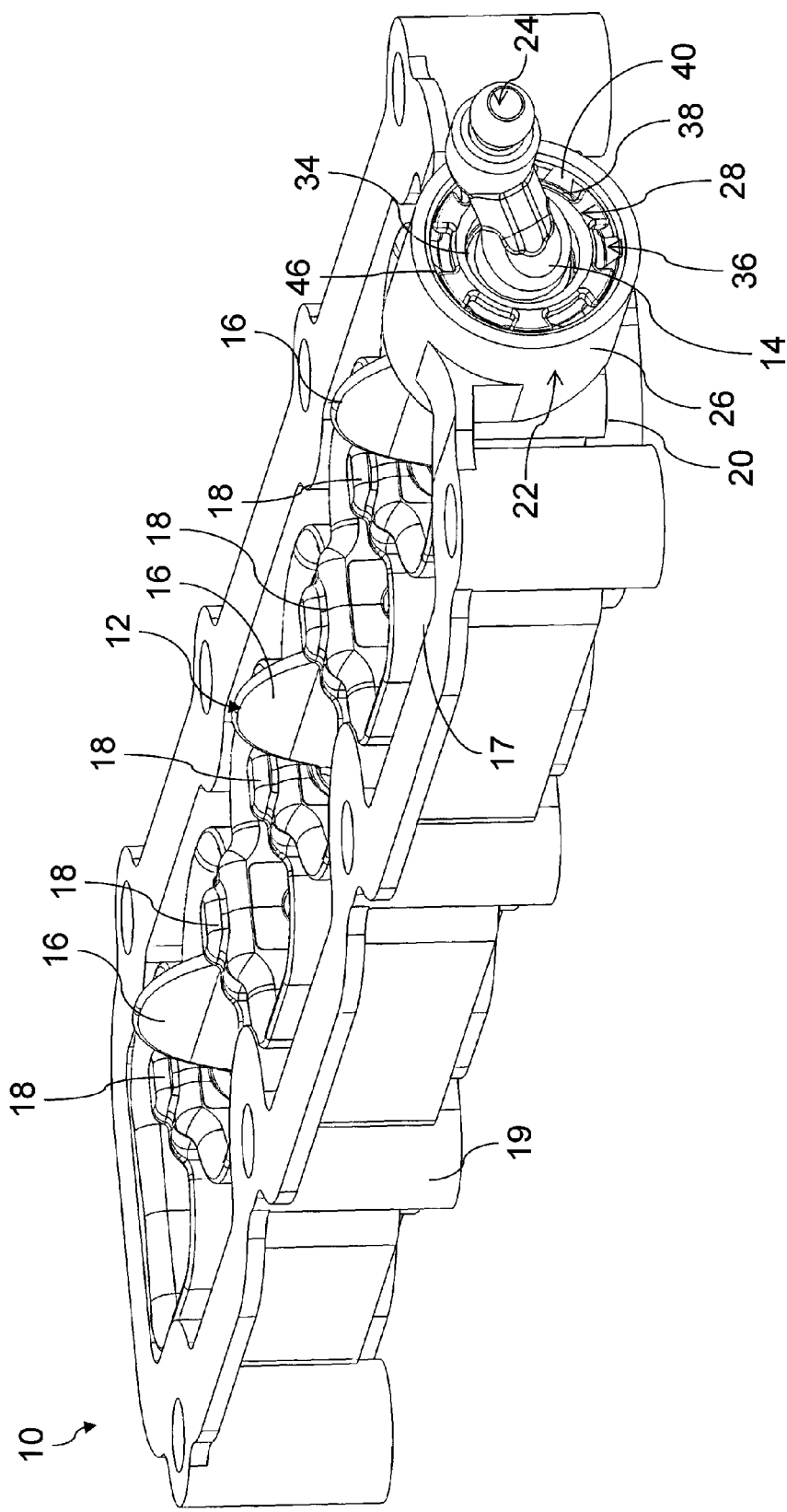
FIG. 1 shows an isometric illustration of a center part of an intake pipe of an internal combustion engine with a valve shaft that is supported in a bearing of a shaft penetration that is provided with a claw ring.

In the Figures, same components are provided with the same reference numerals. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In FIGS. 1 to 3, a center part 10 of an intake pipe, not shown otherwise, of an internal combustion engine is illustrated. In the center part 10 of the intake pipe a valve unit 12 of a valve control of the intake pipe is arranged. The valve unit 12 comprises a valve shaft 14 on which three valves 16 are arranged. By means of the valves 16 openings in the intake pipe, not illustrated, can be opened or closed in order to control a fresh air flow between fresh air collecting chambers and an end pipe in the interior of the intake pipe in a way that is of no interest in the context of the present invention.

In the interior 17 of a housing 19 of the center part 10 of the intake pipe the valve shaft 14 is rotatably supported in five bearing blocks 18. With one end the valve shaft 14 extends out of the housing 19 through a shaft passage 22 of a shaft penetration 23 in a side wall 20 of the center part 10 of the intake pipe. Outside of housing 19, the valve shaft 14 has a control lever 24 which extends substantially perpendicularly to the axis of the valve shaft 14. The valve shaft 14, the valves 16, and the control lever 24 are preferably made monolithically. However, they can also be combined of separate components.

The shaft passage 22 has approximately the shape of a hollow circular cylinder of plastic material that is arranged monolithically in the side wall 20. The shaft passage 22 is open at both end faces. It has radially in inward direction a coaxial bearing receptacle 26 that is coaxial to the valve shaft 14. The radial inner circumferential side of the bearing receptacle 26 or bearing ring seat 26 is of a circular cylindrical shape. The bearing receptacle 26 has at its end face that is facing the interior 17 a stop collar 27 for a bearing 28 of the shaft penetration 23. In the area of the end face that is facing away from the interior 17 of the center part 10 of the intake pipe, the bearing receptacle 26 is enlarged with regard to its cross-sectional area next to a step.

The bearing 28 is coaxially inserted into the bearing receptacle 26. The bearing 28 is made of plastic material. In the bearing 28 the valve shaft 14 is coaxially supported and rotatable about center axis 29 of the bearing 28 indicated in FIG. 3. Axially between the bearing 28 and the stop collar 27, as shown in FIG. 3, an annular glide disk 30 and an annular shaft seal 32 are arranged in a viewing direction from the stop collar 27 to the exterior.

The radial outer circumferential side of the bearing 28 is stepped in accordance with the radial inner circumferential side of the bearing receptacle 26. The outer diameter of a section of the bearing of reduced cross-section corresponds to the inner diameter of the section of the bearing receptacle 26 that is also reduced with respect to its cross-section. The outer diameter of its section that is enlarged with respect to its cross-section corresponds to the inner diameter of the section of the bearing receptacle 26 that is enlarged with respect to its cross-section.

The bearing 28 is illustrated in detail in FIGS. 4 and 5. On its radial inner circumferential side, the bearing 28 is stepped. In the area of its radial outer cross-sectionally enlarged section, the bearing 28 is also enlarged with respect to its cross-sectional area in radial inward direction. The valve shaft 14 in the area of the cross-sectionally enlarged section of the bearing 28 is tapering. Between the tapering section of the valve shaft 14 and the cross-sectionally enlarged section of bearing 28, there is a gap 34 in the mounted state, as illustrated in FIG. 3. The inner diameter of the cross-sectionally reduced section of the bearing 28 corresponds approximately to the outer diameter of the valve shaft 14 outside of this tapering section.

Figure 6:
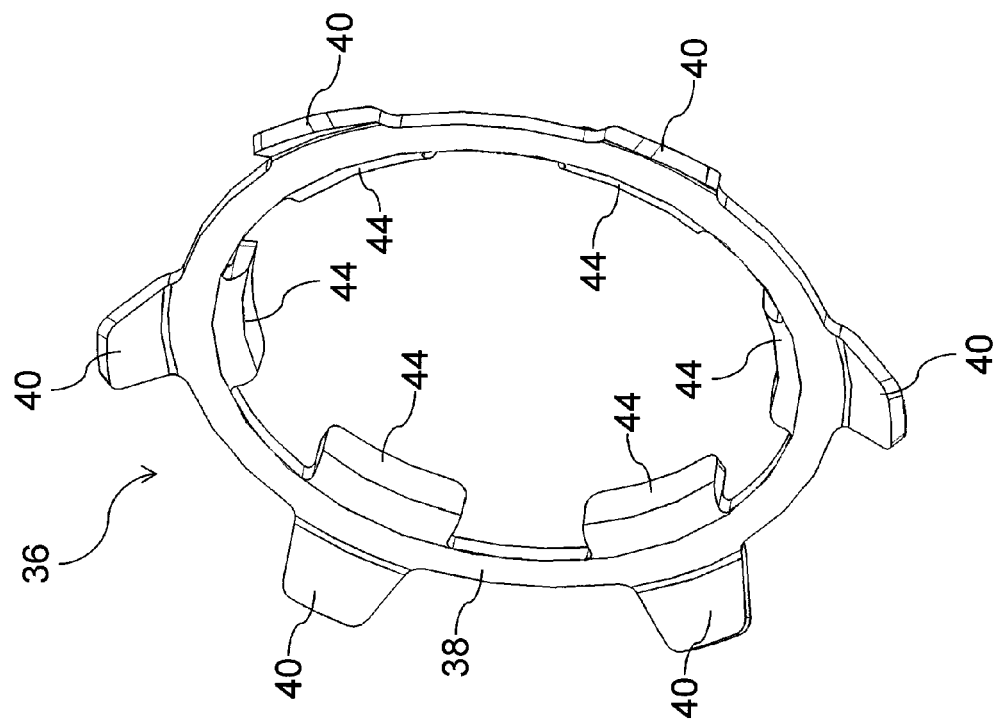
FIG. 6 is an isometric illustration of the claw ring of FIGS. 1 to 5.

On the end face of bearing 28 that is facing the control lever 24 and that is cross-sectionally enlarged, claw ring 36 of metal is integrated into the bearing 28. The claw ring 36 is shown in detail in FIG. 6. The claw ring 36 has an annular support section 38 that is arranged coaxially to the bearing 28. The support ring 38 passes in radial outward direction into six claws 40. The claws 40 are uniformly distributed along the radial outer circumferential side of the support ring 38. The claws 40 extend at a slant to the center axis 29 of the bearing 28, respectively, and they are oriented in the mounted state in a direction opposite to the insertion direction 42, shown in FIG. 3, of the bearing 28 into the bearing receptacle 26. The insertion direction 42 points from the exterior side of the housing 19 to the interior 17. The free ends of the claws 40 face opposite to the insertion direction 42 away from the interior 17 of the housing 19. On its radial inner circumferential side the support ring 38 passes into six counter hooks 44. Each of the counter hooks 44 is positioned opposite one of the claws 40. Adjoining a 90 degree bend, the counter hooks 44 extend away from the support ring 38 in the direction of the center axis of the support ring 38, i.e., in the mounted state in the insertion direction 42 and away from the claws 40. The support ring 38 and the counter hooks 44 are embedded in the bearing 28.

On its outer end face that is facing away from the interior 17, the bearing 28 has six recesses 46 for the claws 40 which are open toward the outer end face and toward the radial order circumferential side of the bearing 28. The recesses 46 therefore provide that the claws 40 as well as the support ring 38 are exposed in this area of the recesses 46 The claws 40 are therefore able to somewhat elastically bend or move in radial direction within the recesses 46 when for example inserting the bearing 28 in the bearing receptacle 26. The counter hooks 44 on the other hand are enclosed completed by the plastic material of the bearing 28. The claws 40 project past the radial outer circumferential side of the bearing 28. When the bearing 28 is mounted, the free ends of the claws 40 are hooked or locked, as illustrated in FIGS. 1 to 3, in the radial inner circumferential side of bearing receptacle 26 and prevent in this way that the bearing 28 can fall out or can be pushed out in the outward direction opposite to the insertion direction 42.

For manufacturing the intake pipe, the housing 19 of the center part 10 of the intake pipe is formed of plastic material, for example, is molded. The valve unit 12 with the valve shaft 14, the valves 16, and control lever 24 is produced monolithically from plastic material. Alternatively, the valve unit 12 can be entirely or partially be made also of a different material, for example, metal. The valve shaft 14 can also be of metal which is embedded in plastic material. The valves 16 can be molded from plastic material integrally onto the valve shaft 14.

The bearing 28 is molded from plastic material wherein the claw ring 36 is captively integrated (embedded or molded) into the bearing 28.

The valve shaft 14 with the control lever 24 leading is threaded from the interior 17 of the center part 10 of the intake pipe through the shaft passage 22. Subsequently, the glide disk 30 and the shaft seal 32 are threaded from the exterior across the control lever 24 and inserted in the insertion direction 42 into the bearing receptacle 26. The bearing 28 is threaded with the counter hooks 44 leading across the control lever 24 and in insertion direction 42 is inserted so deep into the bearing receptacle 26 until the step in its radial outer circumference comes to rests against the step of the radial inner circumferential side of the bearing receptacle 26. Upon insertion, the claws 40, oriented opposite to the insertion direction 42, are further pressed into the radial inner circumferential side of the bearing receptacle 26. The bearing 28 is in this way self-lockingly secured against falling out. Subsequently, bearing blocks 18 are closed and the housing 19 of the center part 10 of the intake pipe is closed with appropriate covers, not shown.

When, for example, in operation of the internal combustion engine a force is acting on the bearing 28 opposite to the insertion direction 42, for example, because of overpressure in the interior 17, the claws 40 are forced farther in radial direction into the inner circumferential side of the bearing receptacle 26 so that their hooking action is reinforced. In this way, it is prevented that the bearing 28 can be pushed out of the bearing receptacle 26. Even for a movement of the bearing 28 opposite to the insertion direction 42, for example, as a result of vibrations, the claws 40 will hook and engage even more strongly in the bearing receptacle 26.

In the above described embodiment of a shaft penetration 23 with a bearing 28, the following modifications are possible inter alia.

The invention is not limited to a shaft penetration 23 for a valve shaft 14 of an intake pipe. Instead, it can be used also for other kinds of shaft penetrations of other types of housings of an internal combustion engine. For example, it can also be used in connection with a shaft penetration for an exhaust valve or an outlet valve of an internal combustion engine.

The radial inner circumferential side of the bearing receptacle 26 in addition can be provided with a plurality of locking recesses that extend circumferentially and that can be engaged by the claws 40.

The bearing 28, instead of being made of plastic material, can be also made of other materials, for example, metal or ceramic. Also, a material mix can be used.

The shaft passage 22, in particular the bearing receptacle 26, instead of being made of plastic material, can also be made of different material, for example metal or ceramic Also, only the radial inner circumferential side of the bearing receptacle 26 can be made of plastic material.

The claw ring 36 can be made, instead of being made of metal, also of different material, for example, ceramic or plastic material or a material mix.

The claw ring 36 can also have fewer or more than six claws 40 and/or six counter hooks 44.

The claws 40 can also be attached in a different way than by means of a claw ring 36 on the bearing 28.

The claw ring 36, instead of being embedded in the bearing 28, can also be secured in a different way thereat.

The cutouts 46 at the end face of the bearing 28 are not mandatory and can be eliminated.

The claws 40 can also be made to be elastic, for example, so as to be springy in radial direction.

The shaft passage 22 can also be designed such that the bearing 28 can be inserted from the interior 17 into the bearing receptacle 26. In this case, the insertion direction 42 is reversed. The bearing 28 is then mounted such that the claws 40 are oriented also opposite to the insertion direction 42 that is oriented from the interior to the exterior.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A bearing for a shaft penetration of a housing, the bearing comprising
   a bearing having a center axis, the bearing having an end face;
   a plurality of claws disposed on the bearing, each of the plurality of claws extending axially outwardly at a slant angle relative to a central axis of the bearing past a radial outer circumferential side of the bearing and having a free end;
   a claw ring with an annular support section, wherein one or more of the plurality of claws are disposed on the annular support section, wherein the claw ring is fixedly connected to the bearing;
   wherein the at least one claw ring is integral with and unitary with the bearing as a one-piece component;
   wherein the plurality of claws and/or the claw ring are molded together with the bearing or overmolded onto the bearing such that the plurality of claws are integral with the bearing;
   wherein the annular support section has a radially outer circumferential side and a radially inner circumferential side;
   wherein the annular support section comprises a plurality of counter hooks, the a plurality of counter hooks arranged on the radial inner side of the annular support section;
   wherein the plurality of counter hooks extend axially away from the support section in the insertion direction and are embedded into material of the bearing in the end face of the bearing.

2. A shaft penetration of a housing, the shaft penetration comprising:
   a bearing receptacle having a center axis and arranged in a wall of the housing;
   a bearing coaxially inserted into the bearing receptacle in an insertion direction, the insertion direction defined by the center axis of the bearing receptacle from an exterior side of the housing to an interior of the housing, the bearing having an end face;
   a plurality of claws disposed on the bearing, each of the plurality of claws extending at a slant angle axially outwardly relative to a central axis of the bearing past a radial outer circumferential side of the bearing and having a free end;
   the free end of each of the plurality of claws extending in a direction opposite to the insertion direction in a radial inner circumferential side of the bearing receptacle;
   a claw ring with an annular support section, wherein one or more of the plurality of claws are disposed on the annular support section, wherein the claw ring is fixedly connected to the bearing;
   wherein the at least one claw ring is integral with and unitary with the bearing as a one-piece component;
   wherein the plurality of claws and/or the claw ring are molded together with the bearing or overmolded onto the bearing such that the plurality of claws are integral with the bearing;
   wherein the annular support section has a radially outer circumferential side and a radially inner circumferential side;
   wherein the annular support section comprises a plurality of counter hooks, the a plurality of counter hooks arranged on the radial inner side of the annular support section;
   wherein the plurality of counter hooks extend axially away from the support section in the insertion direction and are embedded into material of the bearing in the end face of the bearing.

3. The shaft penetration according to claim 2, wherein the counter hooks are comprised of metal.

4. The shaft penetration according to claim 2, wherein the annular support section is comprised of metal.

5. The shaft penetration according to claim 2, wherein said plurality of claws are comprised of metal.

6. The shaft penetration according to claim 2, wherein the bearing is comprised of plastic material.

7. The shaft penetration according to claim 6, wherein said plurality of claws are comprised of metal.

8. The shaft penetration according to claim 2, wherein the radial inner circumferential side of the bearing receptacle is comprised of plastic material.

9. The shaft penetration according to claim 2, wherein the radial inner circumferential side of the bearing receptacle includes a plurality of locking recesses distributed circumferentially, each receiving and engaging a respective one of the plurality of claws.

10. The shaft penetration according to claim 2, wherein the plurality of counter hooks are each aligned and positioned in the insertion direction axially opposite a respective one of the plurality of claws.

11. An intake manifold of an internal combustion engine including a shaft penetration according to claim 2.

* * * * *